United States Patent [19]
Jones, Jr.

[11] 3,748,577
[45] July 24, 1973

[54] CONTINUOUS MONITORING OF ECCENTRICITY AND COAXIAL CAPACITANCE VARIABLES DURING ELECTRICAL INSULATION EXTRUSION

[75] Inventor: Charles Elmer Jones, Jr., Fairfield, N.Y.

[73] Assignee: Bell Telephone Laboratories Incorporated, Murray Hill, N.J.

[22] Filed: Dec. 30, 1971

[21] Appl. No.: 214,329

[52] U.S. Cl.................. 324/61 R, 318/662, 324/54
[51] Int. Cl............................................. G01r 27/26
[58] Field of Search.......................... 324/61 R, 54; 318/662; 323/93

[56] References Cited
UNITED STATES PATENTS

| | | | |
|---|---|---|---|
| 2,604,512 | 7/1952 | Bacon et al....................... | 324/61 R |
| 2,866,146 | 12/1958 | Rodrigez, Jr.................... | 318/662 X |
| 2,892,152 | 6/1959 | Buisson............................. | 324/61 R |
| 2,729,213 | 1/1956 | Broekhuysen et al. ....... | 324/61 R X |
| 2,765,441 | 10/1956 | Gambrill........................... | 324/61 R |
| 2,804,592 | 8/1957 | Biskeborn........................ | 324/61 R |
| 3,096,478 | 7/1963 | Brown................................ | 324/54 |
| 3,209,247 | 9/1965 | Mead et al........................ | 324/61 R |
| 3,355,664 | 11/1967 | Franke.............................. | 324/61 R |
| 3,466,391 | 9/1969 | Ellis................................... | 324/61 R X |

FOREIGN PATENTS OR APPLICATIONS

| | | | |
|---|---|---|---|
| 1,052,321 | 9/1953 | France.............................. | 324/61 R |

*Primary Examiner*—Stanley T. Krawczewicz
*Attorney*—R. J. Guenther, W. L. Keefauver et al.

[57] ABSTRACT

A system for monitoring telephone cable insulation and jacket wall thickness and centering during manufacture consists of four capacitive probe segments spaced at 90° intervals with a dielectric gap separating adjacent segments. The probe is flanked by guard tubes which along with each segment are connected to a switch capable of placing any or all segments at guard potential. In various configurations ordered by the switch, capacitance measurements are made to yield indicia of coaxial capacitance, eccentricity and ovality.

7 Claims, 4 Drawing Figures

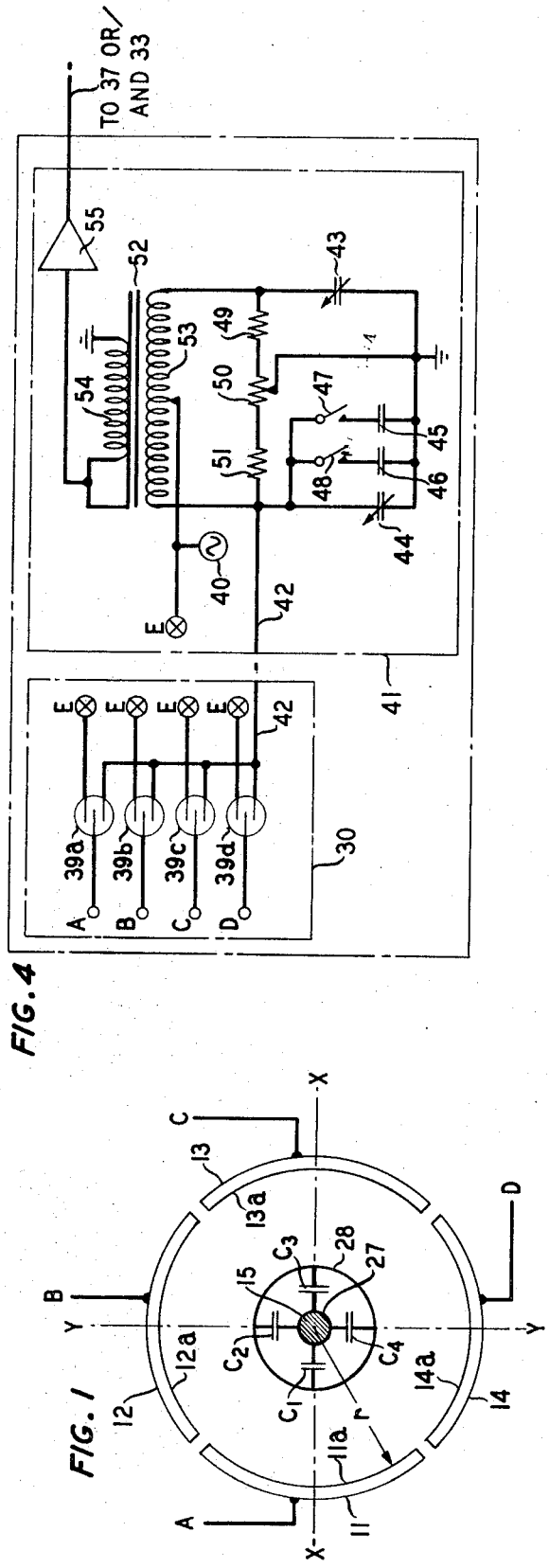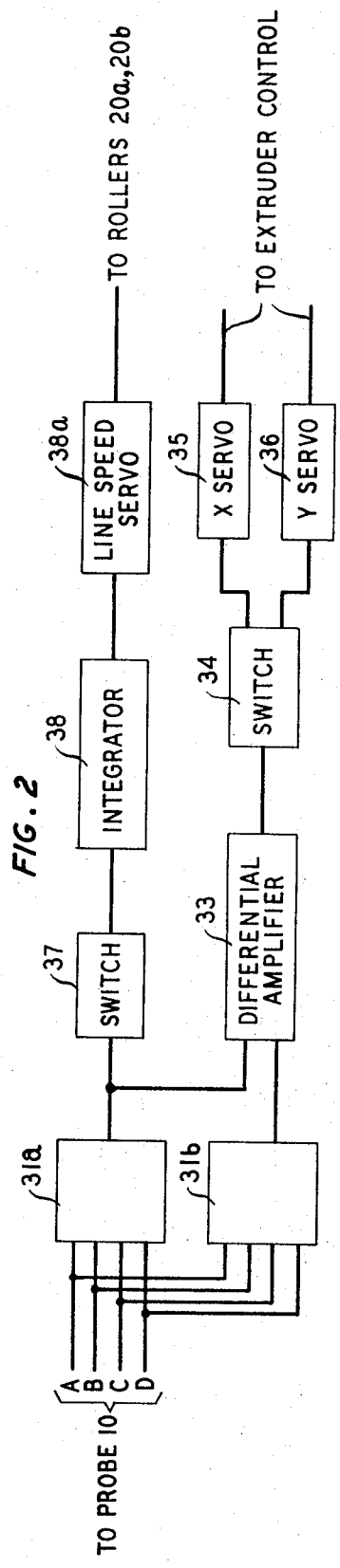

3,748,577

CONTINUOUS MONITORING OF ECCENTRICITY AND COAXIAL CAPACITANCE VARIABLES DURING ELECTRICAL INSULATION EXTRUSION

FIELD OF THE INVENTION

This invention relates to controlling the geometries and related electrical characteristics of extruded primary insulation and extruded jacketing. More particularly, the invention concerns the monitoring of eccentricity and coaxial capacitance of the extruded shape.

BACKGROUND OF THE INVENTION

In the manufacture of plastic-insulated wire, plastic-insulated units known as extruded pair and extruded quad, and in applying plastic jacketing to a cable unit, it is important to maintain a desired uniform insulation or jacket thickness as well as to maintain concentricity of the insulation with respect to a center axis.

For example, during extrusion of plastic insulation on a single wire, the thickness of the insulation as well as its concentricity about the underlying conductor can vary. The resulting variation in coaxial capacitance may be unacceptably high for use of that insulated wire in digital transmission systems and high frequency usages, such as video telephony. Furthermore, a wire that is not centered in its insulation will exhibit a higher coaxial capacitance than would be the case if the same thickness of insulation were maintained concentrically about the wire. Also, the nonconcentrically insulated conductor when combined with a concentrically insulated conductor creates high capacitance unbalance to ground, which again can be unacceptable for the mentioned uses.

It is of course desirable to control as many of the cable manufacturing variables as possible. To this end, capacitance monitors have been used in the prior art to control coaxial capacitance of, for esample, an insulated wire during extrusion. However, these capacitance monitors do not insofar as applicant is aware, provide a measurement of the cross-sectional eccentricity of the insulation about the wire. The eccentricity typically is instead checked by cutting occasional samples of the production line wire and measuring the insulation wall thickness variations using an optical comparator. If this check indicates adjustment is required, the extruder die is adjusted to center the wire. Of course, this technique is time consuming at best, and, in any case, does not provide continuous monitoring.

Accordingly, one object of the invention is to continuously monitor the wall thickness of plastic insulation about a conductor during extrusion.

A further inventive object is to continuously monitor the concentricity, eccentricity, or ovality as the case may be, of plastic insulation with respect to the axis of the underlying wire.

A further inventive object is to monitor and adjust the capacitance unbalance to ground during making of extruded pair or of extruded quad, without the necessity of isolating and switching the individual conductors within the insulation.

A further inventive object is to detect the concentricity, eccentricity, or ovality of extruded insulation during its manufacture, without physically contacting the wire.

A still further inventive object is to monitor the thickness and eccentricity of plastic jacket about a cable core.

SUMMARY OF THE INVENTION

The foregoing and further objects are achieved pursuant to the present invention by a capitance monitor that uses a multisegment capacitance probe with means for electrically isolating a relatively short cable section undergoing the measurement. Circuitry that permits selecting of certain combinations of the segments, or all segments, for the capacitance measurements, is connected between the probes and the monitor indicators.

In general, the structure to be monitored is passed along a locus of points equidistant from each of several probe segments which can, for example, number 4 or 8. At both the input and output sides of the probe, the unit to be monitored is passed through a guard tube which electrically "cuts" the unit so that only the capacitance to ground of the length of wire within the probe is measured.

In a specific embodiment, the probe consists of four segments spaced at 90° intervals with a dielectric gap separating adjacent segments. The probe is flanked by guard tubes which along with each segment are connected to a switch capable of placing any or all segments at guard potential. In various configurations ordered by the switch, capacitance measurements are made to yield indicia of coaxial capacitance, eccentricity and ovality.

BRIEF DESCRIPTION OF THE DRAWING

FIG. 1 is a schematic sectional diagram showing the probe configuration around an insulated conductor to be measured;

FIG. 2 is a schematic block diagram showing various electrical manipulations of the capacitance measurements made possible with an illustrative four-segment probe;

FIG. 4 is a circuit diagram of the probe inputs and a capacitance bridge.

DETAILED DESCRIPTION OF ILLUSTRATIVE EMBODIMENTS

Figure 3:
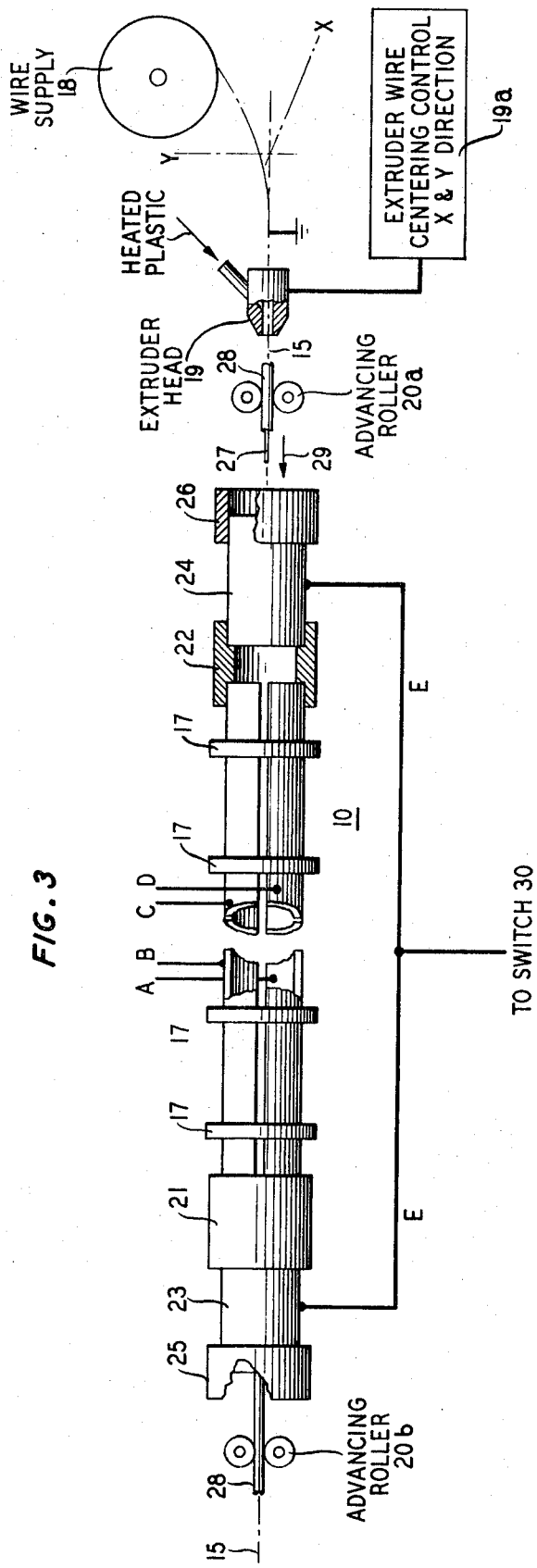
FIG. 3 is a schematic side view of the four-segment probe and associated apparatus.

As seen in FIGS. 1 and 3 a capacitive probe designated 10 consists of four segments 11, 12, 13, and 14 each embracing slightly less than 90° of arc. The four segments 11–14 are arranged so that the four interior surfaces 11a–14a constitute segments of a cylinder of radius $r$ with respect to an axis denoted 15.

The adjacent segments 11–14 are electrically separated, for example, by dielectric gaps, such as gap 16 between segments 13 and 14. The segments 11–14 are mounted in spaced, cylindrical relation by plural phenolic resin washers 17 and by phenolic resin end sleeves 21, 22. Each segment is, for example, 2 inches to 6 inches in length — long enough to obtain the desired sensitivity but short enough to avoid being cumbersome.

Two nonsegmented hollow cylindrical metallic guards 23, 24 are supported coaxially with respect to the probe segments by the sleeves 21, 22 in conjunction with insulative end sleeves 25, 26, respectively.

Use of the probe 10 is illustrated by a wire 27 with plastic insulation 28 moving in tension by action of advancing rollers 20a, 20b along the common axis 15 of the guards 23, 24 and the probe 10. The probe segment interior surfaces 11a–14a and the interior of guards 23, are spaced a distance of the order ½ inch – 1 inch from the outer surface of plastic insulation 28. Moving in the direction of arrow 29, the wire 27 originates from a supply 18, and passes through extruder head 19 which extrudes plastic insulation. Process steps such as cooling baths, etc., are not shown. The insulated wire 27–28 could as well be any other assemblage having a central axis and insulative covering located at some nominal position with respect to a central axis.

Electrical leads denoted A, B, C, D are connected from the respective probe segments 11–14 to a switch 30, as seen in FIG. 4. Electrical leads E likewise are connected from the guards to switch 30 which, as seen in FIG. 4, consists of center open single pole — double throw switches 39a, 39b, 39c, 39d, each capable of connecting its respective lead A–D to a 20KC oscillator 40, or alternatively to a capacitance bridge 41 over a common lead 42.

Bridge monitor 41 is a conventional hybrid coil type direct impedance bridge and consists of transformer 52, whose center tapped primary 53 is used as the ratio arms of the bridge. The secondary winding 54 provides the bridge output which is fed to amplifier 55. The two resistors 49, 51 and variable resistor 50 provide the means to balance the conductance of the insulated wire being measured. Variable capacitor 44, switches 47, 48 and capacitors 45, 46 are used in calibrating and zeroing the bridge. Variable capacitor 43 provides the means to set the bridge for the desired capacitance.

The block diagram shown in FIG. 2 depicts one method of determining the coaxial capacitance and eccentricity of an insulated wire using the segmented probe. Two of the units 31 depicted in FIG. 2 as units 31a and 31b and described above are connected to the electrical leads A, B, C, D from the respective probe segments 11–14. The coaxial capacitance is the sum of the capacitances $C_1$, $C_2$, $C_3$, $C_4$ shown in FIG. 1. With either bridge monitor set at the desired coaxial capacitance using variable capacitor 43, FIG. 4, the output of the monitor 31a will be proportional to any error between the desired and actual coaxial capacitance. By opening switch 34 and closing switch 37 the error voltage is applied only to integrator 38, which in turn drives the line speed servo 38a.

Eccentricity in the X direction is proportional to the difference between capacitances $C_1$ and $C_3$ in FIG. 1. For this measurement probe leads B and D are switched to guard common lead E, probe lead A is connected to monitor 31a and probe lead B is connected to monitor 31b. Switch 37 is open during eccentricity measurements so as not to effect line speed. With both monitors 31a, 31b set at the same desired value the difference in the two monitor signals as detected by differential amplifier 33 is proportional to $C_1$ minus $C_3$. For this measurement switch 34 applies the correction signal to the X-servo 35. Eccentricity in the Y direction is accomplished in the same manner using the Y-servo 36 and the appropriate probe lead connections.

The X-servo 35 and Y-servo 36 develop signals which are then applied in conventional manner to control the extruder head operation through centering control 19a, thus to control the eccentricity of the insulated wire 27–28. The line speed servo 38a develops signals which are applied to advancing rollers 20a, 20b, thus to control the capacitance of the insulated wire 27–28. Table I below shows various positions of the switches 30, 34 and 37 and the resulting measurements.

TABLE I

| Guard | Monitor 31a | Monitor 31b | Switch 37, integrator 38 | Switch 34 X-servo 35 | Switch 34 X-servo 36 | Measurement |
|---|---|---|---|---|---|---|
| None | A, B, C, D | None | In | Out | Out | Coaxial capacitance. |
| B, D | A | C | Out | In | Out | X-eccentricity. |
| A, C | B | D | Out | Out | In | Y-eccentricity. |

It is apparent that the inventive process and apparatus so far described can be connected in numerous ways with a computer control system that in response to the capacitance measurements adjusts the extruder line parameters such as line speed and die orientation.

In a further inventive embodiment, an eight-segment probe (not shown) is used to measure coaxial capacitance, X-eccentricity and Y-eccentricity or extruded pairs and quads; and also to provide ovality measurements for the standard insulated wire eccentricity and coaxial capacitance measurements.

It is to be understood that the embodiments described herein are merely illustrative of the principles of the invention. Various modifications may be made thereto by persons skilled in the art without departing from the spirit and scope of the invention.

What is claimed is:

1. Apparatus for monitoring the capacitance across an insulative layer extruded over an axially advancing metallic member comprising:
   a capacitive probe having plural mutually insulated segments, each said segment comprising an inner surface disposed along a locus of points substantially equidistant from said member axis and in noncontacting relation to said layer;
   guard means enveloping said advancing member adjacent the inlet and the outlet ends of said probe for establishing a reference electrical potential;
   means for maintaining said metallic member at ground potential;
   means for selectively connecting each said segment individually to said guard means thereby placing each segment so connected at said reference potential;
   and means for measuring the capacitance between each segment not so connected and said metallic member.

2. Apparatus pursuant to claim 1 wherein said guard means comprises first and second hollow metallic cylinders disposed coaxially with said probe segments and having their inner surfaces located along said locus of points.

3. Apparatus pursuant to claim 2, wherein the space between said layer, said cylinders and said inner surfaces of said segments constitutes a dielectric medium.

4. Apparatus for monitoring the capacitance across an insulative layer placed over an axially advancing metallic member, comprising:
   means, including two spaced-apart metallic guards each enveloping said advancing insulated metallic member, for electrically isolating a discrete portion of said member from the remainder of said member;

four capacitive plates located between said guards spaced symmetrically about said insulative layer and at equal distances therefrom;

a sinusoidally varying reference electrical signal;

means for connecting said isolating means and ones of said plates to said signal;

and means for measuring the capacitance between each of the remaining said plates and said metallic member.

5. Apparatus pursuant to claim 4, further comprising means for maintaining said advancing metallic member at ground potential.

6. Apparatus pursuant to claim 5, further comprising means for utilizing said capacitance measurements of claim 2.

7. Apparatus for continuously deriving indicia of coaxial capacitance of an insulated conductor and also for deriving indicia of the extent of cross-sectional eccentricity of said insulation about said conductor, comprising:

means for advancing said insulated conductor tautly through a measuring station;

at least four capacitive plates comprising like cylindrical segments symmetrically disposed at said station along a locus of points substantially equidistant from said advancing conductor;

a sinusoidally varying reference source of electrical potential;

guard means disposed on either side of said station and connected to said source and comprising first and second hollow metallic cylinders disposed coaxially with said probe segments and having their inner surfaces located along said locus of points;

means for maintaining said advancing metallic member at ground potential;

capacitive bridge means;

and means for selectively connecting each said segment individually either to said source or to said bridge means whereby, by connecting all said segments to said bridge and none to said source said coaxial capacitance is measured; and by connecting a first set of oppositely disposed said segments to said source and a second set of oppositely disposed said segments to said bridge, a measure of said eccentricity is achieved.

* * * * *